(12) United States Patent
Schmidt et al.

(10) Patent No.: US 8,336,337 B2
(45) Date of Patent: Dec. 25, 2012

(54) METHOD AND DEVICE FOR PRODUCING A BLANK MOLD FROM SYNTHETIC QUARTZ GLASS BY USING A PLASMA-ASSISTED DEPOSITION METHOD

(75) Inventors: Richard Schmidt, Hammersbach (DE); Karsten Bräuer, Bruchköbel (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 963 days.

(21) Appl. No.: 10/519,016

(22) PCT Filed: Jul. 7, 2003

(86) PCT No.: PCT/EP03/07233
§ 371 (c)(1),
(2), (4) Date: Dec. 21, 2004

(87) PCT Pub. No.: WO2004/005206
PCT Pub. Date: Jan. 15, 2004

(65) Prior Publication Data
US 2005/0257570 A1 Nov. 24, 2005

(30) Foreign Application Priority Data
Jul. 9, 2002 (DE) .................................. 102 31 037

(51) Int. Cl.
*C03B 37/018* (2006.01)
(52) U.S. Cl. ................. 65/391; 65/413; 65/414; 65/421; 65/436
(58) Field of Classification Search ................ 65/391, 65/436, 413, 414, 421
See application file for complete search history.

(56) References Cited

U.S. PATENT DOCUMENTS

| | | | |
|---|---|---|---|
| 4,162,908 A | | 7/1979 | Rau et al. |
| 4,402,720 A | * | 9/1983 | Edahiro et al. .................. 65/391 |
| 4,992,642 A | * | 2/1991 | Kamp et al. ............. 219/121.52 |

(Continued)

FOREIGN PATENT DOCUMENTS

DE   25 36 457   2/1977

(Continued)

OTHER PUBLICATIONS

Patent Abstracts of Japan, vol. 012, No. 213, Jun. 17, 1988, for JP 63 011541 A (Jan. 19, 1988).

*Primary Examiner* — Queenie Dehghan
(74) *Attorney, Agent, or Firm* — Tiajoloff and Kelly LLP

(57) ABSTRACT

The invention relates to a method for producing a blank mold from synthetic quartz glass by using a plasma-assisted deposition method, according to which a hydrogen-free media flow containing a glass starting material and a carrier gas is fed to a multi-nozzle deposition burner. The glass starting material is introduced into a plasma zone by the deposition burner and is oxidized therein while forming $SiO_2$ particles, and the $SiO_2$ particles are deposited on a deposition surface while being directly vitrified. In order to increase the deposition efficiency, the invention provides that the deposition burner (1) focuses the media flow toward the plasma zone (4) by. A multi-nozzle plasma burner, which is suited for carrying out the method and which is provided with a media nozzle for feeding a media flow to the plasma zone, is characterized in that the media nozzle (7) is designed so that it is focussed toward the plasma zone (4). The focussing is effected by a tapering (6) of the media nozzle (7).

10 Claims, 2 Drawing Sheets

U.S. PATENT DOCUMENTS

Figure 1:
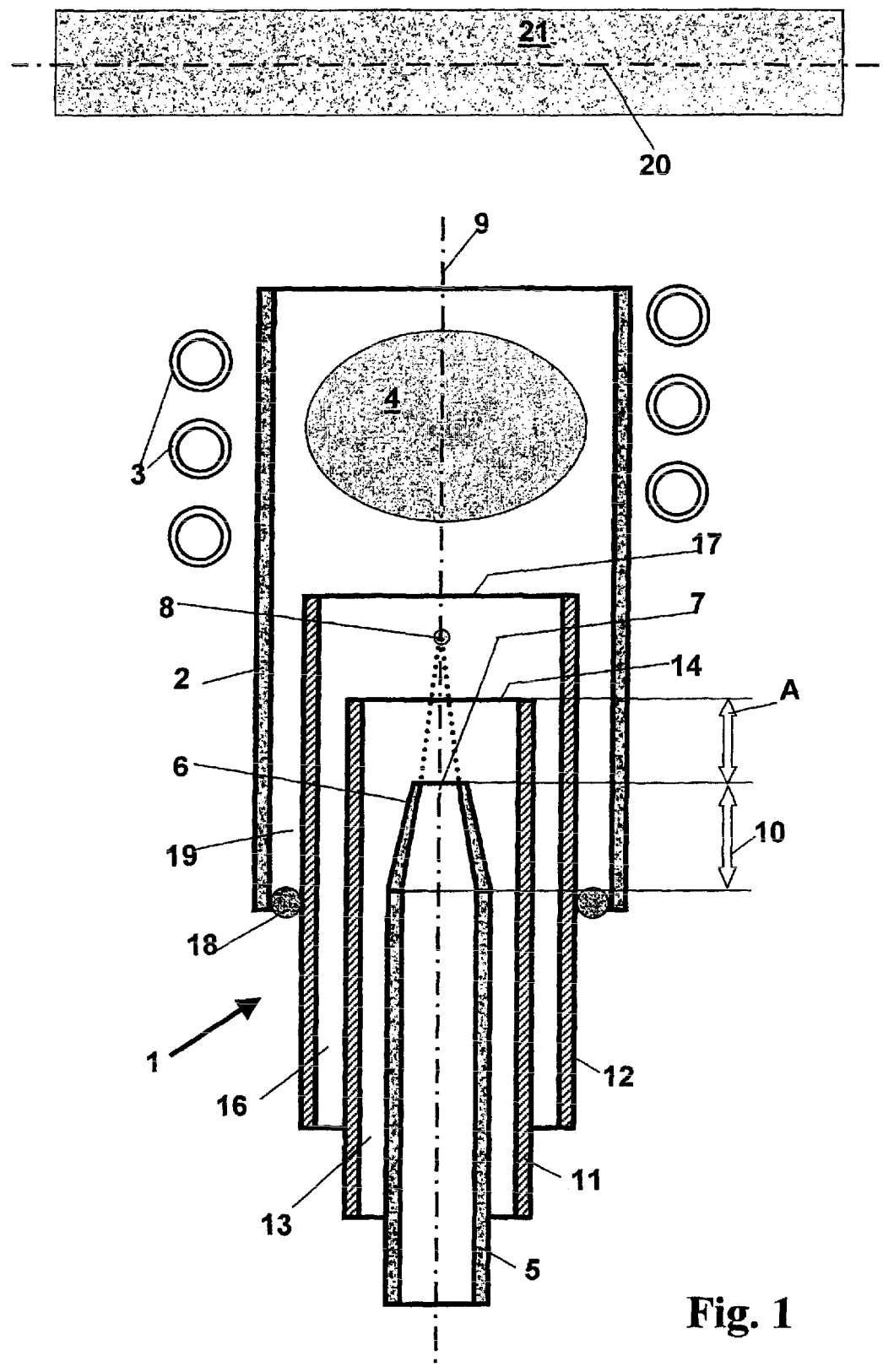

| | | | |
|---|---|---|---|
| 5,154,745 A | 10/1992 | Le Sergent | |
| 5,547,368 A * | 8/1996 | Slavejkov et al. | 431/8 |
| 5,788,730 A * | 8/1998 | Ruppert et al. | 65/17.4 |
| 6,536,240 B1 * | 3/2003 | Gouskov et al. | 65/391 |
| 6,588,230 B1 * | 7/2003 | Misra et al. | 65/17.3 |
| 2002/0179575 A1 * | 12/2002 | Fornsel et al. | 219/121.5 |

FOREIGN PATENT DOCUMENTS

| | | |
|---|---|---|
| FR | 2 714 371 A | 6/1995 |
| GB | 1 520 587 A | 8/1978 |
| JP | 63-011541 A | 1/1988 |
| WO | WO 02 060828 A | 8/2002 |
| WO | WO 03 005780 A | 1/2003 |

* cited by examiner

METHOD AND DEVICE FOR PRODUCING A BLANK MOLD FROM SYNTHETIC QUARTZ GLASS BY USING A PLASMA-ASSISTED DEPOSITION METHOD

The present invention relates to a method for producing a preform from synthetic quartz glass by using a plasma-assisted deposition method in that a media flow containing a glass starting material and a carrier gas is supplied to a multi-nozzle deposition burner, the glass starting material is introduced by means of the deposition burner into a plasma zone and is oxidized therein while forming $SiO_2$ particles, and the $SiO_2$ particles are deposited on a deposition surface while being directly vitrified.

Furthermore, the present invention relates to a device comprising an excitation source for producing a plasma zone, and a multi-nozzle deposition burner which has a central axis and is provided with a media nozzle for supplying a media flow to the plasma zone.

As for the production of optical fiber preforms for commercial applications, methods for depositing $SiO_2$ particles from the gas phase are known under the names OVD (outside vapor deposition), MCVD (modified chemical vapor deposition), and VAD (vapor axial deposition). As a rule, $SiO_2$ particles are produced by flame hydrolysis of silicon-containing glass starting materials in the oxyhydrogen flame of a deposition burner. However, it is also known that silicon-containing glass starting materials are oxidized with the assistance of plasma, and the $SiO_2$ particles produced in this way are then deposited on a carrier.

A plasma-assisted OVD method for producing a cladding glass from fluorine-doped quartz glass for a preform for optical fibers is described in JP-A-61151031. It is suggested that a silicon-containing starting material should be hydrolyzed by means of a multi-channel oxyhydrogen burner while forming $SiO_2$ particles and that the $SiO_2$ particles produced should subsequently be fed to a plasma flame which is generated by means of a high-frequency plasma torch. Due to the high temperatures the particles deposited on a rotating carrier are vitrified immediately, and the otherwise highly volatile dopant fluorine is thereby bound in the glass layer (this method will also be called "direct vitrification" in the following).

A similar method for producing a preform for optical fibers is described in U.S. Pat. No. 5,154,745. It is suggested therein that a preform core of quartz glass should first be produced with a high refractive index and that subsequently a cladding glass of fluorine-doped quartz glass should be deposited, the deposition taking place while using a plasma burner and with direct vitrification of the deposited fluorine-containing $SiO_2$ particles.

A method and a device of the above-mentioned type are known from DE-A 25 36 457. A method is described therein for producing synthetic quartz glass by oxidizing a hydrogen-free silicon compound which has difluoromethane added for fluorine doping. The silicon compound is deposited as vitreous mass on a heat-resistant carrier, the gas flow being passed through an induction-coupled plasma burner.

The device used therefor comprises an induction-coupled plasma burner having three stepped quartz glass tubes that are concentrically arranged relative to one another, and of which the outer tube is the longest one, and the inner tube the shortest one.

The plasma-assisted $SiO_2$ deposition method can be carried out in a hydrogen-free atmosphere, whereby the incorporation of hydroxyl groups into the quartz glass of the preform is largely avoided. As a result, during direct vitrification a hydroxyl-poor quartz glass body is obtained without any further finishing treatment (in contrast to the so-called "soot method"), said quartz glass body being also suited for producing near-core regions of a preform for optical fibers. However, the deposition efficiency in the known plasma deposition methods is in general poor, and there is consequently a continuous need for improving the deposition efficiency of said method.

In this respect it is the object of the present invention to enhance the deposition efficiency in a plasma-assisted $SiO_2$ deposition method.

The device which is known from JP-A 61151031 and used for the plasma-assisted deposition of $SiO_2$ particles on a rotating quartz glass rod consists of a high-frequency plasma torch which produces a plasma flame in the area of the surface of a core glass rod which is rotatable about the longitudinal axis thereof, and of a multi-nozzle flame hydrolysis burner by which $SiO_2$ particles are formed by flame hydrolysis and supplied to the plasma flame, resulting in the deposition of a fluorine-doped quartz glass layer on the core glass rod. It is true that the deposition rate is improved by using a flame hydrolysis burner in combination with the plasma burner. However, on account of the use of an oxyhydrogen burner and the hydrolysis reaction taking place the drawback must be accepted that the deposited layer contains large amounts of hydroxyl groups that limit the possibilities of use of the preform produced in this way.

Therefore, it is also the object of the present invention to indicate a device by means of which an improved deposition rate is achieved in the plasma-assisted deposition of $SiO_2$ particles on a deposition surface without a flame hydrolysis burner being used therefor.

As for the method, the above-mentioned object starting from the method of the above-mentioned type is achieved according to the invention in that the media flow is focused by means of the deposition burner towards the plasma zone.

The media flow contains at least one oxidizable glass starting material and a carrier gas therefor. On the one hand, the carrier gas serves to transport the glass starting material if said material is e.g. present in vapor form. Moreover, the plasma flame is held at a predetermined distance from the deposition burner by the carrier gas flowing out of the deposition burner, and arcing from the plasma zone into the area of the deposition burner is thereby avoided. With the media flow, the oxygen needed for oxidizing the glass starting material, or part of the oxygen, can be introduced into the plasma zone. In the plasma zone the plasma is ignited and the glass starting material is oxidized by reaction with oxygen into $SiO_2$ particles.

Since the media flow is without hydrogen, a hydrogen-free plasma zone can be produced, thereby preventing the formation of hydroxyl groups by reaction with oxygen in the plasma zone, so that the developing $SiO_2$ particles are substantially free from hydroxyl groups. The presence of water in the plasma zone, e.g. caused by air ingress, is thereby avoided as much as possible.

An essential development of the above-explained known method with respect to the improvement of the deposition efficiency is that the media flow is not simply introduced into the plasma zone, but is focused towards the plasma zone, for it has surprisingly been found that a focusing of the media flow towards the plasma zone achieves a more stable gas guidance facilitating the maintenance of position and size of the plasma zone, and that the amount of carrier gas can be considerably reduced in comparison with the non-focusing procedure.

The carrier gas flow contributes to the adjustment of the distance between the plasma zone and the burner mouth of the deposition burner. A sufficiently strong carrier gas flow prevents migration of the plasma flame towards the burner mouth, thereby preventing electrical arcing and depositions of $SiO_2$ particles and an excessive thermal load in the area of the burner mouth. The invention permits a reduction of the carrier gas flow with maintenance of said functions.

The reduction of the carrier gas amount in the media flow has an advantageous effect in several respects. On the one hand, at the same amount the concentration of glass starting material is increased in the media flow and focused onto the plasma zone, so that less glass starting material is guided past the plasma, and conversion is thereby improved. On the other hand, the cooling of the plasma flame accompanying the carrier gas flow is prevented. The increased temperature of the plasma flame in comparison with the non-focusing procedure also contributes to an improvement of the degree of conversion of the glass starting material and thus an increase in the deposition rate.

A focusing towards the plasma zone is achieved through a suitable gas guidance of the media flow. To this end a focusing deposition burner is used that comprises a media nozzle for the supply of the media flow into the plasma zone, which below the nozzle opening comprises a wall inclined towards the plasma zone or which tapers towards the plasma zone. The focus of the media flow is in each case within the plasma zone or in the area between deposition burner and plasma zone.

Of a particularly simple configuration is the variant of the method in which the media flow is focused onto the plasma zone by means of a media nozzle of the deposition burner tapering towards the plasma zone. The media nozzle may be the middle nozzle of the deposition burner, or a nozzle in the form of an annular gap tapering towards the plasma zone, or several individual zones distributed around the central axis, which taper towards the plasma zone. The taper of the media nozzle starts in an area below the nozzle opening and effects a focusing of the media flow in the area of the plasma zone, as explained above.

It has been found to be particularly advantageous when the media flow upon exiting from the media nozzle is enveloped by an oxygen-containing working gas flow having a lower flow rate than the media flow. The working gas flow serves to shield and cool the burner mouth relative to the hot plasma, and at least part of the oxygen needed for forming the $SiO_2$ particles is provided at the same time through the oxygen-containing working gas flow. Since the oxygen-containing working gas flow exits at a lower flow rate than the media flow from the deposition burner, an action on the media flow is largely prevented, so that the focusing thereof onto the plasma zone is maintained.

This effect of the working gas flow is even improved when the working gas flow exits turbulently from a first working gas nozzle of the deposition burner that is configured as a diffuser. The turbulence of the gas flow is here reached through a sufficiently high flow rate—at least in the area after exit from the working gas nozzle. The turbulently exiting working gas flow ensures that the media flow focused onto the plasma zone is less influenced than would be the case with a laminar and also focused working gas flow. To facilitate the adjustment of turbulence, the working gas nozzle is designed as a diffuser; the diffuser may be based on the constructional principle that is generally known in fluidics. It is essential that a turbulent working gas flow is thereby generated that has either no influence or only little influence on the media flow. For instance the opening cross-section of the working gas nozzle may be expanded from an area below the nozzle opening to the nozzle opening. The degree of turbulence of the working gas flow exiting from the working gas nozzle is enlarged by the expansion.

Preferred is a variant in which the working gas flow upon exit from the working gas nozzle is enveloped by at least one oxygen-containing separating gas flow which exits from an annular gap nozzle coaxially surrounding the working gas nozzle. The separating gas flow primarily serves to cool and shield the burner mouth against the hot plasma. To this end the separating gas flow has a higher flow velocity than the working gas flow. Moreover, part of the oxygen needed in the plasma zone is provided by the separating gas flow. Working gas flow and separating gas flow can be adjusted independently of one another, so that size and position of the plasma zone can be flexibly predetermined in this respect within certain limits.

Preferably, the plasma zone is produced by means of high-frequency excitation inside a burner tube into which a mixture of media flow and working gas flow is introduced. This procedure ensures that media flow and working gas are already mixed before the plasma zone to some degree so that an effective reaction takes place inside the plasma zone between the oxygen-containing working gas and the glass starting material and only a small amount of unreacted glass starting material will pass outside the plasma zone.

It has turned out to be particularly useful when the media flow contains silicon tetrachloride ($SiCl_4$) and nitrogen as the carrier gas.

The method of the invention is particularly suited for producing fluorine-doped quartz glass. To this end a glass starting material is used that contains a fluorine-containing component.

As for the device, the above-indicated object starting from the device of the above-mentioned generic type is achieved according to the invention in that the media nozzle is configured to focus towards the plasma zone.

This configuration of the media nozzle ensures that, when exiting from the deposition burner, the media flow is focused towards the plasma zone. The focusing of the media flow towards the plasma zone achieves a stable gas guidance, which facilitates the maintenance of position and size of the plasma zone and permits a reduction of the amount of carrier gas, in comparison with the non-focusing procedure, without the plasma flame traveling towards the deposition burner and causing electrical arcing and $SiO_2$ depositions or an excessive thermal load on the media nozzle.

As for the advantages of a reduction of the carrier gas amount in the media flow, reference is made to the above explanations regarding the method of the invention. The media nozzle focusing towards the plasma zone has a wall inclined towards the plasma zone below the nozzle opening, or it tapers in an area below the nozzle opening towards the plasma zone.

Especially because of its easy handling and production, the last-mentioned variant is preferred, wherein the media nozzle tapers in a taper area towards the plasma zone. The media nozzle may be the middle nozzle of the deposition burner, or it may be a nozzle in the form of an annular gap tapering towards the plasma zone, or several individual nozzles distributed around the central axis, which taper towards the plasma zone. The taper of the media nozzle starts in an area below the nozzle opening and effects a focusing of the media flow into the area of the plasma zone, as explained above.

It has been found to be particularly advantageous when the tapering area has a length of at least 5 mm, preferably at least 8 mm. A tapering area of this length ensures a sufficient degree of focusing gas guidance.

In a preferred design of the apparatus of the invention, the media nozzle has a nozzle opening with a diameter ranging between 4.5 and 6.5 mm, preferably in the area between 5.0 mm and 6.0 mm. The media nozzle is here designed as a central middle nozzle of the deposition burner.

It has been found that optimum focusing as well as an optimized deposition rate is achieved with a nozzle opening within the indicated range.

In a preferred development of the device of the invention, the media nozzle is designed as a central middle nozzle and is coaxially surrounded by a working gas nozzle in the form of an annular gap which is designed as a diffuser and is continuously expanded in an expansion area towards the plasma zone.

A working gas flow which affects the focusing of the media gas flow as little as possible is introduced through the working gas nozzle surrounding the middle nozzle. To this end the working gas nozzle is designed as a diffuser which is continuously expanded in an expansion area towards the plasma zone. Due to the expansion the working gas nozzle acts as a diffuser so that the degree of turbulence of the working gas flow exiting out of the working gas nozzle increases in the area of the nozzle opening. This has the effect that the focused media gas flow that is exiting more inwards is less impaired than would be the case with a directed working gas flow.

It has turned out to be useful when the expansion area has a length of at least 5 mm, preferably at least 8 mm. A sufficient degree of turbulence is achieved in the area of the working gas flow through a diffuser of the indicated length.

Furthermore, it has turned out to be advantageous when the media nozzle comprises a nozzle opening which extends in a first nozzle plane extending perpendicular to the central axis and when the working gas nozzle comprises a nozzle opening which extends in a second nozzle plane extending in a direction perpendicular to the central axis, the first nozzle plane, when viewed in the direction of flow, being arranged upstream of the second nozzle plane by a length between 5 mm and 35 mm, preferably between 13 mm and 23 mm.

The opening of the working gas nozzle and the opening of the media nozzle are spaced apart from one another. It has been found that the spacing has some influence on the deposition of $SiO_2$ particles on the burner mouth. Due to the upstream arrangement of the first nozzle plane in said area, a premature particle formation and thus depositions on the nozzle edge are prevented.

It has turned out to be useful that the media nozzle is formed by a quartz glass tube. A quartz glass tube is characterized by a high chemical and thermal stability. Moreover, an input of impurities into the plasma zone is largely avoided. It has also turned out to be advantageous in this respect that the media nozzle terminates in a burner tube of quartz glass surrounding the plasma zone.

In a particularly preferred embodiment of the device according to the invention, there are provided a central inner tube forming the media nozzle, and at least two outer tubes that coaxially surround the inner tube and form annular gap nozzles or circular nozzles for the supply of oxygen to the plasma zone. The nozzles of the deposition burner are here formed by several tubes that are coaxially arranged relative to one another. The nozzle openings may here be arranged at different levels. They are therefore configured as an annular gap or, in the case of an outer tube projecting over all inner nozzles, to be circular in their area projecting beyond the inner nozzles. The last-mentioned nozzles are also designated in the following as "annular gap nozzles". Such a deposition burner is of a constructionally simple configuration and can be produced at low costs. The invention will now be explained with reference to an embodiment and a drawing in more detail. The drawing is a schematic illustration showing in detail in FIG. 1 an embodiment of the device of the invention to be used for producing a preform for optical fibers, in a side view; and in FIG. 2 an embodiment of the device modified in comparison with FIG. 1, in a side view.

EXAMPLE

The device shown in FIG. 1 is used for producing a preform for optical fibers, comprising a core of undoped quartz glass and a cladding of fluorine-doped quartz glass.

The device consists of a plasma burner having assigned thereto reference numeral 1 on the whole, and of a burner tube 2 of quartz glass within which plasma 4 is ignited by means of a high-frequency coil 3.

The plasma burner 1 comprises an inner tube 5 of quartz glass through which glass starting material ($SiCl_4$ and $SF_6$ for fluorine doping) and a carrier gas in the form of nitrogen are supplied to the plasma 4. The opening of the inner tube 5 which is oriented towards the plasma 4 has a cone 6 which forms a media nozzle 7 tapering towards the plasma 4. The focus 8 of the media nozzle 7 is positioned just below the plasma 4 on the longitudinal axis 9 of the plasma burner 1. In its cylindrical area, the diameter of the inner tube 5 is about 10 mm, the opening diameter of the media nozzle 7 is 5.2 mm, and the length of the cone 6 as indicated by the arrow 10 is about 10 mm.

The inner tube 5 is coaxially surrounded by two tubes 11; 12 of special steel. Working gas in the form of oxygen is introduced into the annular gap 13 between the inner special-steel tube 11 and the inner tube 5. The annular gap 13 expands in the area of the upper nozzle opening facing the plasma 4 while forming a diffuser 14. Since this expansion is due to the conical taper of the inner tube 5, the lengths of the expansion and of cone 6 are identical (arrow 10). The distance "A" between the nozzle opening of the inner special-steel tube 11 (diffuser 14) and the media nozzle 7 is 23 mm. In its cylindrical part, the gap width of the annular gap 13 is about 6 mm.

In the annular gap 16 between inner tube 11 and outer tube 12, separating gas is introduced in the form of oxygen. The separating gas primarily serves to cool and shield the plasma burner 1 relative to the hot plasma. The gap width of the annular gap 16 is about 3 mm. The opening of the annular gap 16 which faces the plasma forms an outer nozzle 17 which is open towards the plasma 4, the outer tube 12 projecting over the inner tube 11 by about 13 mm towards the plasma 5.

The interior of the burner tube 2 is sealed relative to the outer atmosphere, as indicated by the sealing ring 18. In an alternative embodiment of the device of the invention, additional working gas in the form of oxygen is introduced into the annular gap 19 between burner tube 2 and outer tube 12.

The method of the invention will now be explained by way of example with reference to the device shown in FIG. 1.

40 g/min $SiCl_4+SF_6$ and 7 l/min nitrogen are supplied to the inner tube 5. The plasma 4 can thereby be kept at a distance of about 20 mm from the burner mouth (edge of the outer nozzle 17). Moreover, 40 l/min oxygen as working gas is introduced into the annular gap 13, and 70 l/min oxygen as separating gas into the annular gap 16.

In the area of the plasma 4, $SiCl_4$ is oxidized to obtain $SiO_2$ particles, and said particles are deposited on the outer cylindrical surface of a core glass rod 21 rotating about its longitudinal axis 20 and are directly vitrified in this process. Due to a cyclically reversing movement of the plasma burner 1 along the outer cylindrical surface, a preform is built up layerwise for an optical fiber. For producing a fluorine-doped cladding glass of the preform (quartz glass with 5% by wt. of fluorine), $SF_6$ is additionally admixed to the $SiCl_4$ as fluorine source.

Since hydrogen-free plasma is employed, a preform is obtained that is essentially free of hydroxyl groups. The OH content in the fluorine-doped cladding area of the preform is about 4 wt ppm. It is important that in the method of the invention a relatively high deposition efficiency of the used raw material is obtained that is about 100% higher than in the method described hereinafter with reference to a comparative example.

Said high deposition efficiency is solely due to the focusing of the media flow towards the plasma 4 and the fluidic effect of the diffuser 14. This is demonstrated by the following comparative example.

Comparative Example

Figure 2:
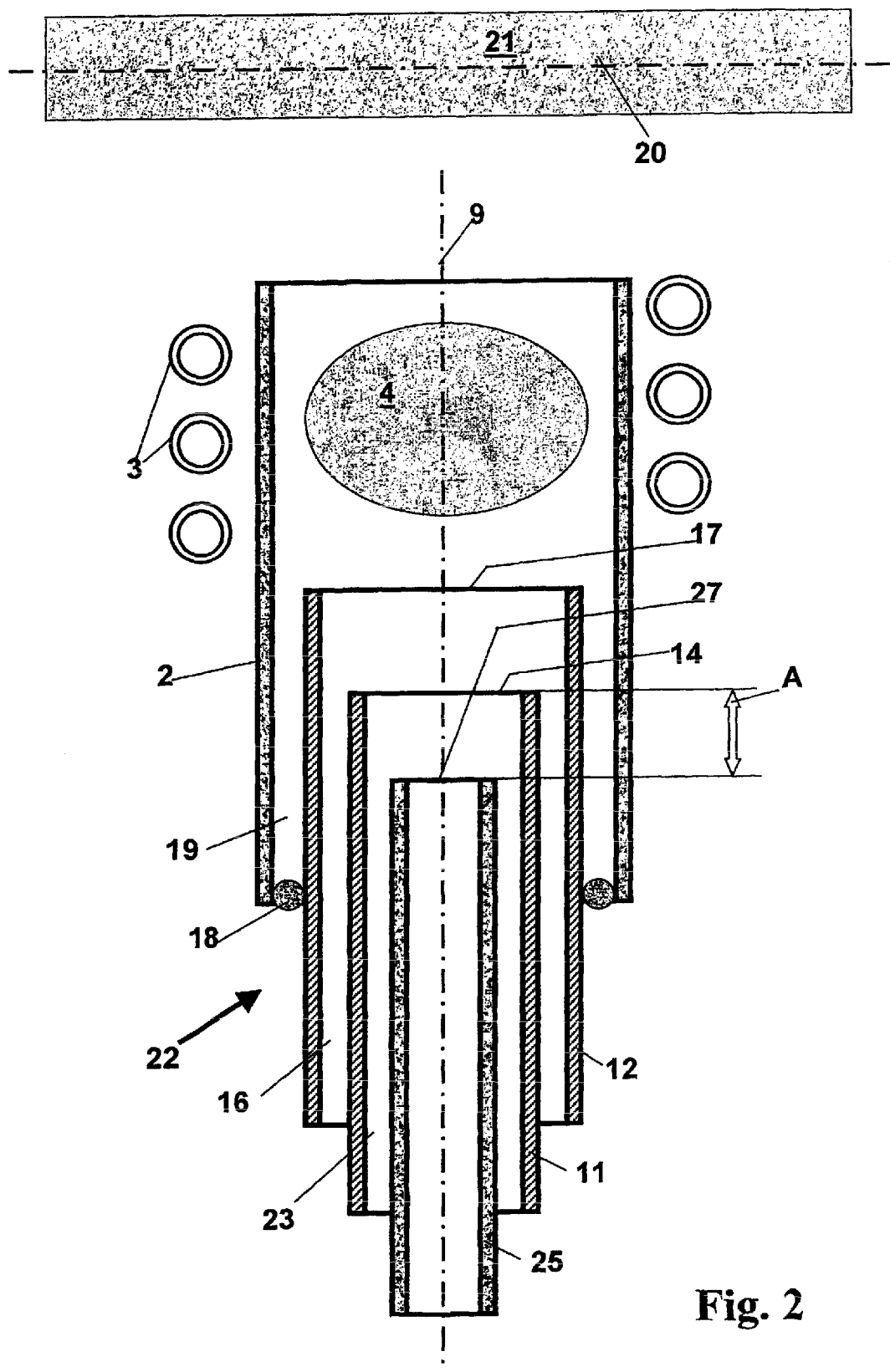

For producing a preform the device shown in FIG. 2 is used. The device differs from the device of FIG. 1 only by the plasma burner 23; to be more exact, solely in the configuration of the inner tube 25.

As for the configuration of the inner tube 25, the difference with respect to the device of FIG. 1 is that the inner tube 25 is made cylindrical over its whole length with an inner diameter of 10 mm. Therefore, the annular gap 23 adjoining the inner tube 25 has no conically outwardly expanding area as does the annular gap 13 of the device according to FIG. 1. The distance A between the nozzle openings of inner tube 25 and inner special-steel tube 11 is 23 mm.

The device according to FIG. 2 is used in the same way for producing a preform as described above with reference to FIG. 1. 40 g/min $SiCl_4$+$SF_6$ is supplied to the inner tube 25. However, it becomes apparent that, in contrast to the method of Example 1, not 7 l/min nitrogen, but 20 l/min nitrogen must be supplied to the inner tube 25 to keep the plasma 4 at a distance of about 20 mm from the burner mouth (edge of the outer nozzle 17). The relatively high amount of supplied nitrogen effects an enhanced dissipation of the used $SiCl_4$ in plasma 4 and within the burner tube 2 and, in addition, an enhanced cooling of the plasma 4. The accompanying losses of material and energy lead in this procedure to a relatively low deposition efficiency.

The invention claimed is:

1. A method of producing a preform of synthetic quartz glass, said method comprising:
   supplying a gaseous hydrogen-free media flow-comprising a glass starting material that contains silicon tetrachloride ($SiCl_4$) and nitrogen as a carrier gas to a media nozzle of a multi-nozzle deposition burner, said media nozzle comprising a wall defining a passage therein communicating with a nozzle opening so that the gaseous media flow passes through the passage and through the nozzle opening, said wall having a tapered portion wherein the passage tapers inwardly up to the nozzle opening;
   enveloping the media flow when exiting from the media nozzle with an oxygen-containing working gas flow flowing through a working gas nozzle, and
   enveloping the working gas flow when exiting from the working gas nozzle with at least one oxygen-containing separating gas flow exiting from an annular gap nozzle coaxially surrounding the working gas nozzle;
   the gaseous media flow from the media nozzle being focused into a plasma zone; oxidizing the glass starting material in the plasma zone so as to form $SiO_2$ particles; and depositing the $SiO_2$ particles on a deposition surface while being directly vitrified;
   wherein the tapered portion has a length of at least 5 mm; and wherein the nozzle opening ranges between 4.5 mm and 6.5 mm in diameter.

2. The method according to claim 1, wherein the working gas flow turbulently exits from the working gas nozzle of the deposition burner that is configured as a diffuser.

3. The method according to claim 1, wherein the method further comprises producing the plasma zone by high-frequency excitation inside a burner tube into which a mixture of the media flow and the working gas flow is introduced.

4. The method according to claim 1, wherein the glass starting material contains a fluorine-containing component.

5. The method according to claim 1, wherein the length of the tapering area is at least 8 mm.

6. The method according to claim 1, wherein the nozzle opening ranges between 5.0 mm and 6.5 mm in diameter.

7. The method according to claim 1, wherein said working gas and annular gap nozzles have cylindrical walls concentric with and surrounding the media nozzle, said cylindrical walls of the working gas and annular gap nozzles defining annular gaps between each other and around the media nozzle.

8. The method according to claim 1, wherein the working gas nozzle is cylindrical and coaxial to the media nozzle, and the working gas nozzle extends beyond the nozzle opening of the media nozzle.

9. The method according to claim 8, wherein the annular gap nozzle extends beyond an end of the working gas nozzle.

10. The method according to claim 1, wherein the wall of the media nozzle tapers inward at an angle that converges on a point between the nozzle opening and the plasma zone.

* * * * *